D. J. DEMAS.
TIRE.
APPLICATION FILED MAY 29, 1920.

1,383,190.

Patented June 28, 1921.
2 SHEETS—SHEET 1.

Inventor
D. J. Demas

By Ch. Parker
Attorney

D. J. DEMAS.
TIRE.
APPLICATION FILED MAY 29, 1920.

1,383,190.

Patented June 28, 1921.
2 SHEETS—SHEET 2.

Inventor
D. J. Demas,
By
Attorney

UNITED STATES PATENT OFFICE.

DEMETREOS J. DEMAS, OF PITTSBURGH, PENNSYLVANIA.

TIRE.

1,383,190.  Specification of Letters Patent.  Patented June 28, 1921.

Application filed May 29, 1920. Serial No. 385,280.

*To all whom it may concern:*

Be it known that I, DEMETREOS J. DEMAS, a citizen of the United States, residing at Pittsburgh, in the county of Allegheny and State of Pennsylvania, have invented certain new and useful Improvements in Tires, of which the following is a specification.

This invention relates to tires, and it comprises a tire casing or shoe having the usual inner layers of fabric and an outer surface of rubber, in combination with a reinforcement or armor arranged between the fabric and rubber, and consisting of a plurality of substantially parallel spaced cords arranged circumferentially of the tire, and transverse cords of smaller size interwoven with said circumferential cords, and serving to retain them in position; all as more fully hereinafter set forth and as claimed.

An object of the present invention is the construction of a tire shoe or casing for pneumatic tires which is practically puncture proof and in which the possibility of blow-outs is minimized.

In the present invention, I have produced an armor adapted to be arranged within the casing and form an integral part thereof. The appearance of the casing is not affected by the armor nor is the resiliency and other properties of the ordinary tire casing changed.

Figure 1:
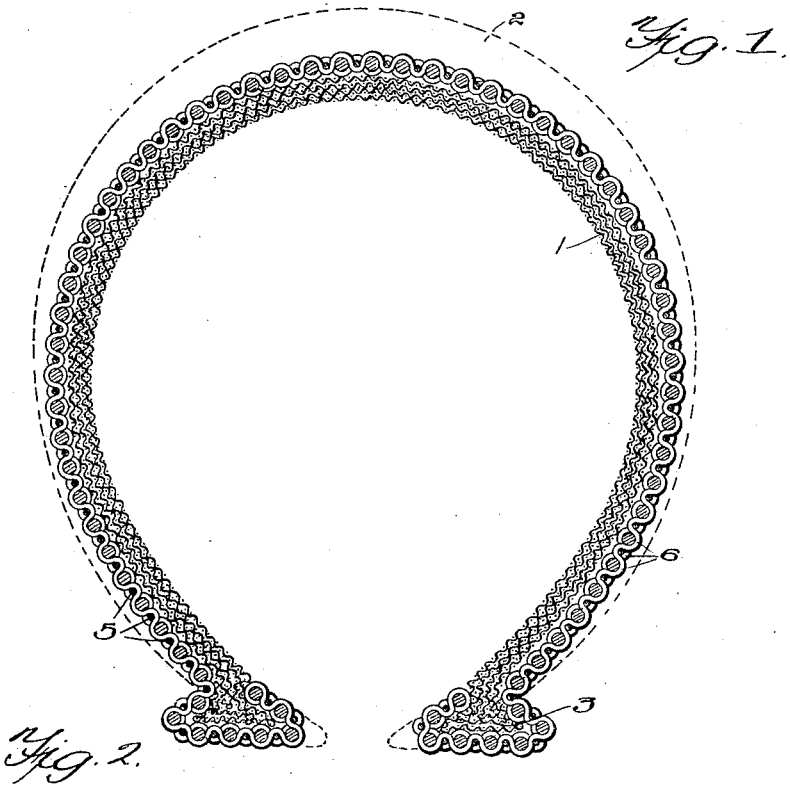
Figure 2:
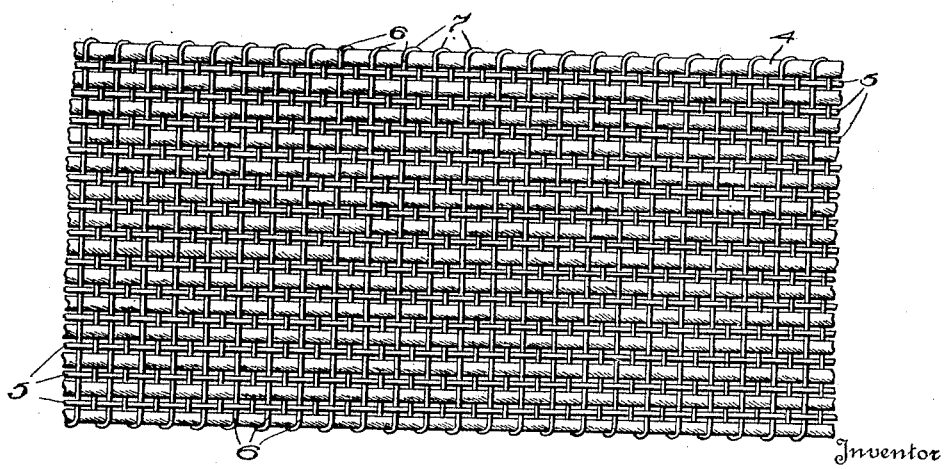
Figure 3:
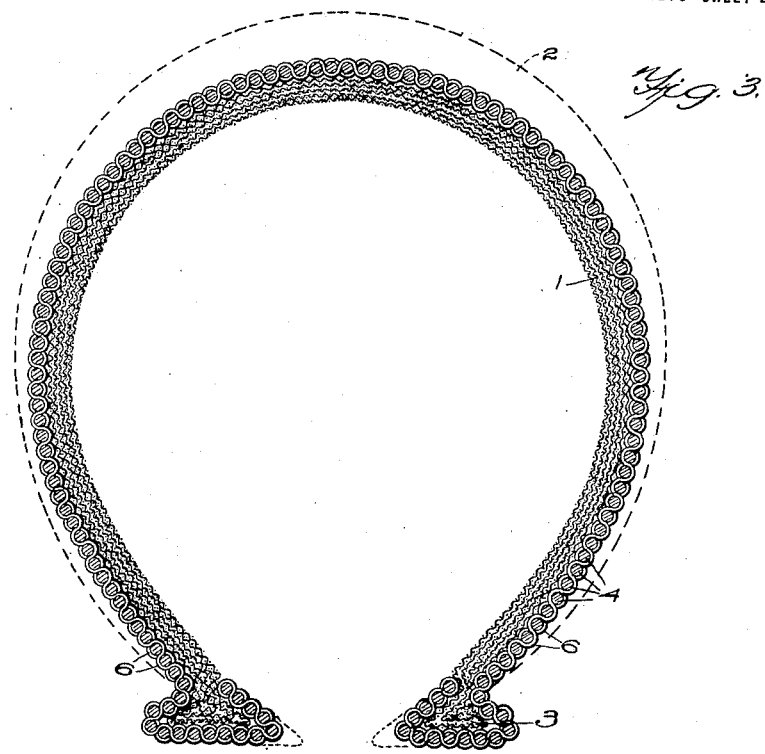
Figure 4:
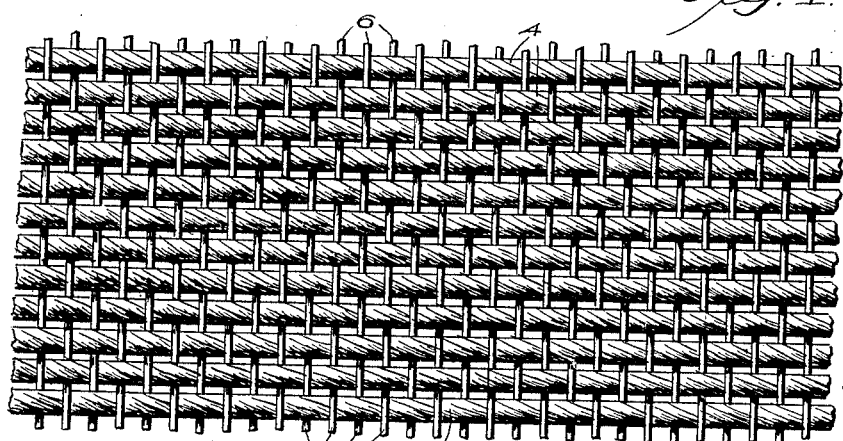

In the accompanying drawings, I have shown several embodiments of my invention. In this showing:

Figure 1 is a transverse section of a tire casing or shoe showing the armor applied, Fig. 2 is a plan view of the armor removed, Fig. 3 is a transverse section of a tire casing embodying a modified form of armor, and, Fig. 4 is a plan view of the armor employed in connection with the tire shown in Fig. 3.

Referring to the drawings, the reference numeral 1 designates a plurality of layers of fabric which form the carcass of the tire casing or shoe. The number of layers of fabric to be employed varies with the size of the tire to be constructed, and any suitable number may be used. The outer section of the tire is formed of rubber 2, illustrated in the drawings in dotted lines. The rubber 2 is of greater thickness at the upper portion of the tire than in the side wings, as in the usual construction, and the tire is provided with the usual bead 3, adapted to be received in the flange of a tire rim (not shown) for securing the tire to a wheel.

The improved armor forming the subject matter of the present invention is arranged in the casing between the fabric and the rubber, as shown in Fig. 1. The detail construction of the armor is shown in Fig. 2 of the drawings. Referring to this figure, the armor comprises a plurality of circumferential cords or ropes 4 which are arranged entirely around the tire and are slightly spaced from each other. A second series of cords of smaller diameter may be arranged between each pair of the cords 4, as at 5. These cords are retained in proper position by transverse cords 6 which are woven across the circumferential cords, as shown in Fig. 2 of the drawings, passing above and below alternate cords. The cords 6 may be made of a single member looped at each side, as at 7, and carried back across the circumferential cords.

In Figs. 3 and 4 of the drawings, I have shown a slightly different form of armor in which the cords 5 are eliminated. As shown in Fig. 4, the circumferential cords 4 are made of slightly larger strands or threads of cord or rope and are slightly spaced from each other. In this figure, I have illustrated the transverse cords 6 separate from each other, the cords being bound or secured at the ends in any suitable manner (not shown). With either form of the armor, either arrangement of the transverse cords may be employed, and I may employ the two sets of circumferential cords shown in Figs. 1 and 2 of the drawings with separate transverse cords, as shown in Fig. 4 of the drawings.

It is to be understood that the forms of my invention herewith shown and described are to be taken as preferred examples of the same, and that various changes in the shape, size, and arrangement of parts may be resorted to without departing from the spirit of the invention or the scope of the subjoined claims.

I claim:

1. In a tire, the combination with a carcass formed of a plurality of layers of fabric and an outer covering of rubber, of an armor arranged between the carcass and the rubber covering, said armor consisting of a plurality of circumferential, spaced cords, a second series of circumferential cords of smaller size arranged alternately therewith, and transverse cords interwoven with said circumferential cords.

2. In a tire, the combination with a carcass formed of a plurality of layers of fabric and an outer covering of rubber, of an armor arranged between the carcass and the rubber covering, said armor consisting of a plurality of circumferential, spaced cords, a second series of circumferential cords of smaller size arranged alternately therewith, and means for retaining said circumferential cords in position, said means comprising a transverse cord interwoven with said circumferential cords from side to side and looped around the circumferential cord at each side.

In testimony whereof I affix my signature in presence of two witnesses.

DEMETREOS J. DEMAS.

Witnesses:
G. WILLIAM JONES, Jr.,
ARNOLD HERMANN.